United States Patent

Tershak

[11] 4,126,112
[45] Nov. 21, 1978

[54] BREAKERLESS ELECTRONIC IGNITION SYSTEM

[75] Inventor: Andrew T. Tershak, Evansville, Ind.

[73] Assignee: Eltra Corporation, Toledo, Ohio

[21] Appl. No.: 662,178

[22] Filed: Feb. 27, 1976

[51] Int. Cl.$^2$ ............................ F02P 5/04; F02P 1/00
[52] U.S. Cl. ............................ 123/148 E; 123/117 R; 331/65
[58] Field of Search ............ 123/117, 148 E, 148 CB; 331/65

[56] References Cited

U.S. PATENT DOCUMENTS

| | | | |
|---|---|---|---|
| 3,153,205 | 10/1964 | Jones et al. | 331/65 |
| 3,392,348 | 7/1968 | Bartley | 331/65 |
| 3,550,571 | 12/1970 | Mainprize | 123/117 R |
| 3,552,367 | 1/1971 | Slihi | 123/117 R |
| 3,587,552 | 6/1971 | Varaut | 123/117 R |
| 3,923,030 | 12/1975 | Luteran | 123/117 R |
| 3,952,715 | 4/1976 | Van Siclen | 123/117 R |
| 4,037,577 | 7/1977 | Gallo | 123/148 E |

*Primary Examiner*—Ronald B. Cox
*Attorney, Agent, or Firm*—Robert E. Greenstien

[57] ABSTRACT

Ignition pulses are supplied to an internal combustion engine from a breakerless electronic ignition system wherein the ignition pulses are produced in response to the movement of teeth on an electrically conductive trigger wheel past an inductive sensor. The inductive sensor is part of a LC tank circuit of an oscillator normally producing an oscillatory output signal which is detected by a bistable demodulator, and as a tooth moves into close proximity with the inductive sensor energy from the tank circuit is lost through an inductive coupling with the trigger wheel until the oscillatory output signal is terminated. The bistable demodulator responds to the absence of an oscillatory output signal by producing a timing signal which causes an ignition pulse to be supplied to the engine. The trigger wheel rotates in synchronization with the engine, and the initial timing of the ignition system is determined by setting the relative positions of the sensor and the trigger wheel. To advance or retard the initial timing of the ignition system, a resistor is connected across the tank circuit by a controllable switch to control the energy level in the tank circuit and hence the time required to terminate the oscillatory output signal. The initial timing of the ignition system may be set with the resistor electrically connected across the tank circuit, and upon the occurrence of engine conditions may result in undesirable ignition knock the controllable switch may be rendered nonconductive so as to retard the timing of the ignition pulses. Alternatively, the initial timing of the ignition system may be set with the resistor electrically connected across the tank circuit so that under certain engine operating conditions the switch may be rendered conductive to advance the initial timing of the ignition system. The switch connecting the resistor across the tank circuit may be a transistor which is rendered fully conductive or nonconductive by control signals produced according to predetermined engine operating conditions, or alternatively the conduction of the transistor may be gradually varied from fully conductive to nonconductive so as to serve as a variable resistor gradually increasing or decreasing the resistance across the tank circuit and thereby gradually advancing or retarding the initial timing of the ignition system.

5 Claims, 4 Drawing Figures

BREAKERLESS ELECTRONIC IGNITION SYSTEM

This invention relates to an electronic ignition system for an internal combustion engine such as used in motor vehicles, and more particularly to an arrangement for electronically varying the timing of ignition pulses supplied to the engine to prevent undesirable ignition knock.

In operating an internal combustion engine, it is desirable to supply ignition pulses to the engine in timed relation with the movement of a piston in a combustion chamber so as to effect ignition of a combustible mixture at an optimum time for enabling the resulting propellant gases to impart a maximum driving movement to the piston. In the past, the ignition pulses have typically been produced in response to the opening and closing of conventional breaker points in accordance with the movement of a distributor mechanism rotating in synchronism with the operation of the engine. More recently, the breaker points have been replaced with breakerless electronic ignition systems, one type of which is shown in U.S. Pat. No. 3,316,448. In this electronic ignition system, a trigger wheel rotates with the distributor mechanism, and ignition pulses are produced in response to the movement of teeth on the trigger wheel past a sensor mounted on a conventional breaker plate.

As is conventional, the timing of the ignition system is initially set by rotating the distributor mechanism to position the sensor relative to the trigger wheel so as to provide the engine with a suitable operating performance at a relatively low engine speed, such as an idle speed. To enable the engine to continue operating efficiently at increased engine speeds and loads, the timing of the ignition pulses is varied by rotating the breaker plate to shift the relative positions of the trigger wheel and the sensor. The movement of the breaker plate is typically effected by a centrifugal advance mechanism which responds to changing engine speeds and a vacuum advance mechanism which responds to variations in the engine load.

In setting the initial timing of the ignition system, it is desirable to maximize the performance of the engine, and this may be accomplished by advancing the timing as far as possible without encountering an undesirable ignition knock. Ignition knock occurs under certain engine operating conditions when an advancing flame front compresses the remaining unburned air-fuel mixture sufficiently so as to initiate further ignition of the air-fuel mixture resulting in an excessive overpressure in the combustion chamber. The undesirable ignition knock may be caused by several factors including preignition, the use of an improper grade of fuel, an improper air-fuel mixture or hot cylinder walls.

However, the degree to which the timing of the ignition system may be advanced varies according to different situations. In some situations the engine can accommodate a greater advancement of ignition timing, for example, when the engine is cold or when the air is less dense, such as during operation of the engine at a higher altitude. In other situations, the engine can only accommodate lesser degrees of ignition timing advancement such as when the engine is being operated with a fuel having a lower temperature of combustion and faster flame propagation.

Although the timing of the ignition system could be set initially to compensate for a particular situation as mentioned above, it would also affect the operation of the engine throughout a range of different engine speeds and loads resulting in a deterioration of overall engine performance. Moreover, the operating conditions of the engine may vary substantially within a relatively short period of time as in the case of an automobile engine, and the timing of the ignition system must be set initially to accommodate a variety of different operating conditions.

Accordingly, an object of the present invention is to optimize the performance of an engine by providing an improved ignition system wherein the initial timing may be varied in accordance with a predetermined set of engine operating conditions.

Another object of the present invention is to provide an improved breakerless ignition system wherein the initial timing may be varied electronically to minimize the occurrence of ignition knock.

An additional object of the present invention is to provide an improved ignition system which minimizes the occurrence of ignition knock so as to facilitate the use of less expensive grades of fuel in an engine.

Still other objects, features and advantages of the present invention will become apparent to those skilled in the art from a reading of the following detailed description of several embodiments of the invention, taken in conjunction with the accompanying drawing, wherein.

Figure 1:
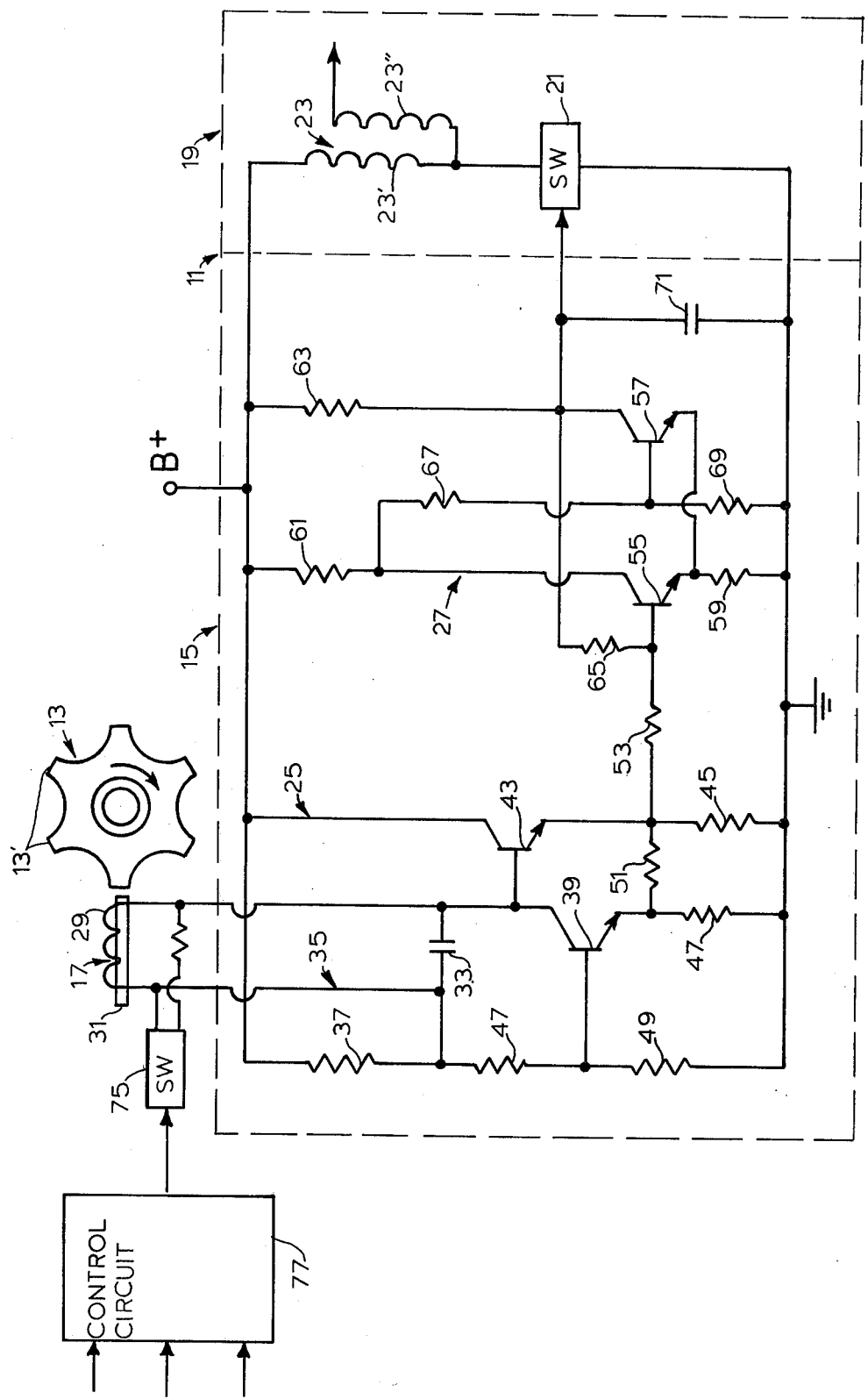
FIG. 1 is a schematic diagram of an electronic ignition system constructed in accordance with the present invention.

Referring now in detail to FIG. 1 of the drawing, there is shown an ignition system, generally indicated 11, for supplying ignition pulses to an engine, not shown, in timed relation with the movement of a plurality of pistons in the cylinders of the engine. The movement of the pistons is indicated by a trigger wheel 13 which is rotatable in synchronism with the operation of the engine, and the movement of the trigger wheel 13 is sensed by a detector 15 having a sensor, generally indicated 17, which is located adjacent to the trigger wheel 13. The detector 15 responds to the movement of the trigger wheel 13 in a manner to be described below to produce timing signals, and an ignition means, generally indicated 19, is actuated with each timing signal to produce ignition pulses which are supplied to the different engine cylinders by a distributor mechanism, not shown. The timing of the ignition pulses may be varied by shifting the relative positions of the trigger wheel 13 and the sensor 17, and the timing is varied in accordance with the speed of the engine by a centrifugal advance mechanism while the timing is also varied according to the load on the engine by a vacuum advance mechanism. The details of the engine as well as the distributor mechanism have not been shown since they form no part of the present invention and may be desirably conventional. Although the invention is described in association with a reciprocating type of engine having a plurality of pistons, it is to be understood that it may also be used with other types of engines, for example a Wankel engine.

As shown, the trigger wheel 13 has a plurality of teeth 13' formed on its periphery with each tooth 13' corresponding to a different piston, and the trigger wheel 13 may be mechanically associated with the distributor mechanism for rotation in synchronization with the operation of the engine. The trigger wheel 13 may be constructed from a suitable electrically conductive material, for example copper, and the detector 15 may be of the type shown for example in the above-mentioned U.S. Pat. No. 3,316,448 as well as U.S. Pat. No. 3,473,110 which produces a timing signal, as will be described below, when an electrical conductor comes in close proximity to the sensor 17.

As also shown, the ignition means 19 may be of the inductive discharge type and includes a suitable switch 21 connecting a primary winding 23' of an ignition coil, generally indicated 23, in series with a suitable source of potential for energizing the ignition coil 23 when the switch 21 is conductive. When the switch 21 is rendered nonconductive in response to a timing signal from the detector 15, an ignition pulse is induced in a secondary winding 23" of the ignition coil 23 and supplied to the engine in the usual manner. Although the ignition means 19 is illustrated and described as an inductive discharge type, it will be appreciated that a capacitive discharge type of ignition means could also be used. Moreover, although the above-mentioned U.S. Pat. No. 3,316,448 shows the detector 15 in combination with a capacitive discharge type of ignition circuit, it will be readily apparent that the detector 15 may be used with an inductive type of ignition circuit and the above-mentioned U.S. patents may be referred to for further details.

As discussed above, the detector 15 produces timing signals which actuate a switch 21 of the ignition means 19, and the timing signals are produced in response to the movement of the trigger wheel 13 past the sensor 17 which may be located in the distributor mechanism adjacent the trigger wheel 13. The detector 15 includes an oscillator, generally indicated 25, which normally produces an oscillatory output signal which is terminated upon movement of a tooth 13' of the trigger wheel 13 into close proximity with the sensor 17. As will be explained below, the presence or absence of the oscillatory output signal is detected by a bistable demodulator, generally indicated 27, and when the oscillatory signal is terminated the bistable demodulator 25 produces a timing signal which actuates the switch 21 of the ignition means 19 so as to produce an ignition pulse. Upon movement of the tooth 13' of the trigger wheel 13 away from the sensor 17, the oscillator 25 again produces an oscillatory output signal and the bistable demodulator 27 responds by removing the timing signal from the switch 21.

As shown, the sensor 17 is in the form of an inductive coil 29 wound around a ferrite rod 31, and the coil 29 is connected in parallel with a capacitor 33 to form a LC tank circuit, generally indicated 35, of the oscillator 25. The LC tank circuit 35 is connected in series between a resistor 37 leading to a suitable voltage source, such as a regulated power supply, and a collector of an NPN transistor 39 having its emitter connected by a resistor 41 to a suitable ground potential. The collector terminal of the NPN transistor 39 is also connected to a base terminal of another NPN transistor 43 which has its collector connected to the voltage source and its emitter connected by a resistor 45 to the ground potential. A biasing potential for the transistor 39 is provided by the junction of two resistors 47, 49 which form a voltage divider, generally indicated 48, that is connected in series between the resistor 37 and the ground potential, and a feedback voltage is provided by a resistor 51 connected between the emitters of the transistors 39, 43.

Upon energization of the detector circuit 15, the transistor 39 is forwardly biased into conduction by the biasing signal from the voltage divider 48 and current flows through the resistor 37 into the tank circuit 35 which develops an oscillating current with the capacitor 33 alternately charging and discharging to opposite polarities through the inductive coil 29 as is known in the art. The transistor 43 is connected in an emitter follower configuration, and the potential at the collector of the transistor 39 biases the transistor 43 into conduction to produce a corresponding output signal across the resistor 45. As the capacitor 33 is alternately charged in opposite directions, it varies the biasing potential on the base of the transistor 43 to produce an oscillating output signal across the resistor 45, and the oscillatory output signal is supplied through the resistor 51 to provide a feedback signal varying the forward bias on the transistor 39. Accordingly, an oscillatory output signal with an increasing potential results in a feedback signal which reduces the conduction of the transistor 39, and conversely an oscillatory output signal of decreasing potential results in a feedback signal which increases the conduction of the transistor 39.

The operation of the oscillator 25 is normally accompanied by energy losses from the tank circuit 35, and the oscillator 25 continues to operate only so long as the energy losses do not exceed the energy stored in the tank circuit 35 over a period of time. As a tooth 13' of the electrically conductive trigger wheel 13 moves into proximity with the sensor 17, the electromagnetic field associated with the inductive coil 29 induces eddy currents in the trigger wheel 13 thereby dissipating energy from the tank circuit 35, and the amount of energy dissipated in the trigger wheel 13 increases as the tooth 13' moves into closer proximity with the sensor 17 until the oscillating output signal is terminated. Upon movement of the tooth 13' away from the sensor 17, an oscillating current again develops in the tank circuit 35, thereby enabling the oscillator 25 to again produce an oscillatory output signal.

As previously mentioned, the presence or absence of an oscillating output signal is detected by the bistable demodulator 27 which produces timing signals for actuating the switch 21 of the ignition means 19 to cause ignition pulses to be supplied to the engine. As shown, the bistable demodulator 27 is in the form of a modified Schmidt trigger circuit with the output signal from the oscillator 25 applied through a coupling resistor 53 to a base terminal of an NPN transistor 55 while the timing signals are applied to the switch 21 of the ignition means 19 from the collector of another NPN transistor 57. The emitters of both transistors 55, 57 are connected by a common resistor 59 to the ground potential while the collectors are connected through separate resistors 61, 63 respectively, to the voltage source. The transistor 55 is normally biased into conduction by a biasing potential applied to its base through a resistor 65 connected to the collector of the transistor 57, and a biasing potential is applied to the base of the transistor 57 from the junction of a pair of resistors 67, 69 which are connected in series between the collector of the transistor 55 and the ground potential. Upon conduction of the transistor 55, its emitter potential increases while its collector potential decreases thereby reversely biasing transistor 57 nonconductive. Conversely, the conduction of transistor 57 reduces its collector potential while increasing its emitter potential to reversely bias transistor 55 nonconductive.

The bistable demodulator 27 responds to varying signal levels supplied to the base of the transistor 55 by producing either high level or low level output signals at the collector of the transistor 57, and to prevent the bistable demodulator 27 from following the oscillations in the output signal from the oscillator 25, a capacitor 71 is connected between the ground potential and the resistor 63 to form a RC charging circuit with a time constant longer than the time period of the oscillations in the output signal from the oscillator 25. When a tooth 13' of the trigger wheel 13 moves into proximity with the sensor 17 and terminates the oscillatory output signal, the transistor 55 is rendered conductive and reversely biases transistor 57 nonconductive causing the capacitor 71 to charge to a high potential thereby providing a timing signal for actuating the switch 21 of the ignition means 19 to supply an ignition pulse to the engine. Upon movement of the tooth 13' away from proximity with the sensor 17, the bistable demodulator 27 again receives the oscillatory output signal which renders the transistor 55 nonconductive, thereby biasing transistor 57 into conduction and discharging the capacitor 71 to remove the timing signal from the switch 21.

From the foregoing, it is apparent that the initial timing of the ignition system 11 is dependent not only upon the relative positions of the sensor 17 and the trigger wheel 13, but also upon the electrical characteristics of the oscillator 25 which determine the energy stored in the tank circuit 35 and the energy losses accompanying the operation of the oscillator 25 over a period of time. In accordance with the present invention, the initial timing of the ignition system 11 is varied under a predetermined set of engine operating conditions so as to optimize the performance of the engine while minimizing the occurrence of ignition knock, and this is accomplished by altering the electrical characteristics of the oscillator 25 so as to change the amount of time required for the energy lost through the teeth 13' of the trigger wheel 13 to terminate the oscillatory output signal.

As shown, the electrical characteristics of the oscillator 25 are varied by connecting a resistor 73 across the tank circuit 35 to reduce the energy in the tank circuit 35 and thus enable the oscillatory output signal to be terminated more quickly when a tooth 13' of the trigger wheel 13 moves into proximity with the sensor 17. The resistor 73 is connected across the tank circuit 35 by a controllable switch 75 which is rendered conductive or nonconductive in response to control signals from a control circuit 77 in accordance with predetermined engine operating conditions. The controllable switch 75 may be in the form of a reed switch, a semiconductor switch or any other suitable form of switch. The control circuit 77 may be in any suitable form such as AND or NAND gates, and the signals indicative of the different engine operating conditions may be produced by any suitable means.

The initial timing of the ignition system 11 may be set without the resistor 73 electrically connected across the tank circuit 35 so that the timing of the ignition system 11 is advanced when the switch 75 is rendered conductive. Alternatively, the initial timing of the ignition system 11 may be set with the resistor 73 electrically connected across the tank circuit 35 so as to retard the timing of the ignition system 11 when the switch 75 is rendered nonconductive.

Figure 2:
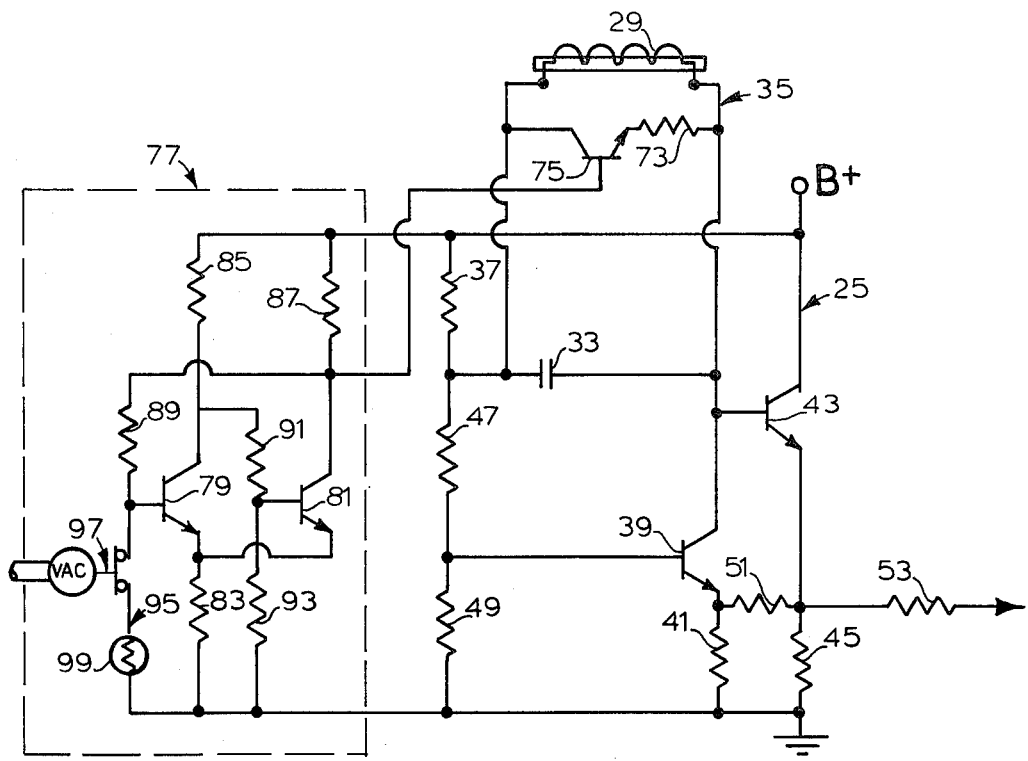
FIG. 2 is a partial schematic diagram of the ignition system shown in FIG. 1 and illustrating an arrangement for retarding the initial timing by a unit amount.

In FIG. 2, the oscillator 25 of the detector 15 is shown with a switch 75 and control circuit 77 arrangement for retarding the initial timing of the ignition system 11 when the engine operating conditions may result in undesirable ignition knock such as when the engine is using an improper yet inexpensive grade of fuel. As shown, the resistor 73 is connected across the tank circuit 35 by a switch 75 in the form of an NPN transistor, and the initial timing of the ignition system 11 is set with the transistor switch 75 biased into saturation by a control signal from a control circuit 77 which includes a pair of NPN transistors 79, 81 connected together to form a Schmidt trigger circuit similar to that of the bistable demodulator 27. The emitters of both transistors 79, 81 are connected by a common resistor 83 to a ground potential while the collectors are connected through separate resistors 85, 87 respectively, to the voltage source. The transistor 79 is normally biased into conduction by a biasing potential applied to its base through a resistor 89, and a biasing potential is applied to the base of the transistor 81 from the junction of a pair of resistors 91, 93 which are connected in series between the collector of the transistor 79 and the ground potential. The control signals for the transistor switch 75 are supplied from the collector of the transistor 81, and with transistor 79 biased into conduction its emitter potential increases while its collector potential decreases thereby reversely biasing transistor 81 nonconductive to produce a control signal which biases the transistor 75 into saturation to electrically connect the resistor 73 across the tank circuit 35.

Since the operation of an engine with an improper grade of fuel usually results in an undesirable ignition knock when the engine is operating under a load and the cylinder walls are hot, the control circuit 77 is provided with engine sensing means, generally indicated 95, for sensing predetermined operating conditions of the engine and reversing the conduction of the transistors 79, 81 to provide a control signal which biases the transistor switch 75 nonconductive so as to electrically disconnect the resistor 73 from the tank circuit 35 and retard the timing of the ignition system 11 as previously discussed. As shown, the load on the engine is indicated by a vacuum switch 97 which is normally closed but opens when the vacuum pressure at the intake manifold of the engine is sufficiently high and the temperature of the engine is indicated by a thermister 99 which undergoes a substantial change in resistance at a preselected temperature. The vacuum switch 97 and the thermister 99 are connected in series between the base of the transistor 71 and the ground potential and normally the base of the transistor 79 is effectively disconnected from the ground potential. However, when the engine is operating under a sufficient load and the temperature of the engine is sufficiently high, the vacuum switch 97 closes and the resistance of the thermister 99 decreases to reduce the bias on the base of the transistor 79 and render it nonconductive, thereby increasing its collector potential and reducing its emitter potential to forwardly bias the transistor 81 into conduction. The conduction of transistor 81 lowers its collector potential and removes the forward bias from the transistor switch 75, thereby electrically disconnecting the resistor 73 from the tank circuit 35 to retard the timing of the ignition system 11.

Figure 3:
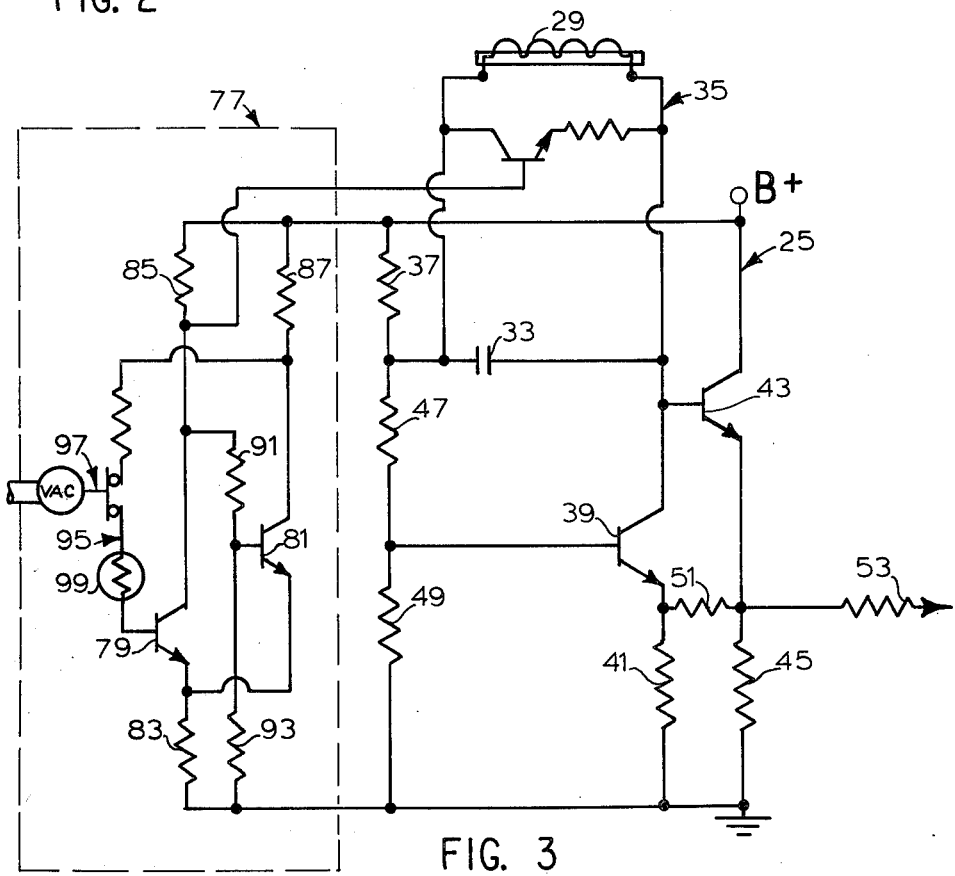
FIG. 3 is a partial schematic diagram of the ignition system shown in FIG. 1 and illustrating an arrangement for advancing the initial timing by a unit amount.

The oscillator 25 of the detector 15 is shown in FIG. 3 with a switch 75 and control circuit 77 arrangement for advancing the initial timing of the ignition system 11 under certain operating conditions of the engine. As shown, the resistor 73 is connected across the tank circuit 35 by a switch 75 in the form of a NPN transistor, and the initial timing of the ignition system 11 is set with the transistor switch 75 biased nonconductive by a control signal from a control circuit 77. The control circuit 77 is generally similar to the control circuit 77 shown in FIG. 2, and accordingly identical reference numerals have been placed on similar components. However, in this arrangement the control signals for the transistor switch 75 are provided from the collector of the transistor 79 so as to normally render it nonconductive, and the engine sensing means 95 are connected to the base of the transistor 79 in series with the resistor 89 to normally provide a low resistance during the operation of the engine. When the engine is cold and under a relatively light load such as when the engine is being started, the engine sensing means 95 provide a much greater resistance which renders the transistor 79 nonconductive and increases the potential of its collector to provide a control signal biasing the transistor switch 75 into conduction to electrically connect the resistor 73 across the tank circuit 35 to advance the timing of the ignition system 11.

Figure 4:
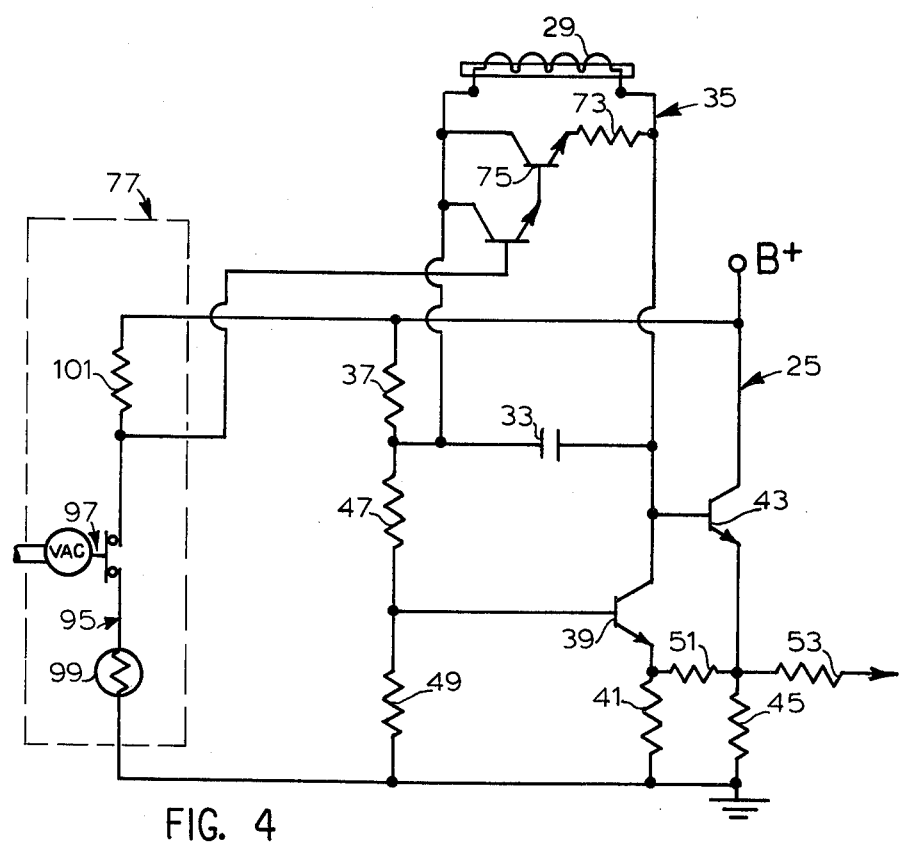
FIG. 4 is a partial schematic diagram of the ignition system shown in FIG. 1 and illustrating an arrangement for advancing or retarding the initial timing by variable amounts.

If a sudden change in the initial timing of the ignition system 11 is undesirable, then the oscillator 25 of the detector circuit 15 may alternatively be provided with a transistor switch 75 and control circuit arrangement 77 for variably increasing or decreasing the amount of resistance connected across the tank circuit 35. In FIG. 4, the oscillator 25 is shown with a control circuit 77 providing control signals for variably biasing a transistor switch 75' from fully conductive to nonconductive conditions upon the occurrence of predetermined engine operating conditions. As shown, the resistor 73 is connected across the tank circuit 35 by a transistor switch 75' in the form of a pair of NPN transistors arranged in a conventional Darlington configuration, while the control circuit 77 is in the form of a voltage divider having a vacuum switch 97 and a thermister 99 connected in series between the ground potential and a resistor 101 leading to the voltage source with the control signal supplied to the transistor switch 75' from the junction of the resistor 101 and the engine sensing means 95.

As previously discussed, to avoid ignition knock when the engine is using an improper grade of fuel the initial timing of the ignition system 11 may be set with the resistor 73 electrically connected across the tank circuit 35 and the resistor 73 may be subsequently disconnected from the tank circuit 35 upon the occurrence of predetermined engine operating conditions. Normally the vacuum switch 97 is open and the thermister 99 provides a relatively large resistance so as to produce a control signal biasing the transistor switch 75' into saturation. As the engine load and temperature increase, the vacuum switch 97 closes and the resistance of the thermister 99 decreases so as to gradually reduce the bias on the transistor switch 75' causing it to operate in the active region and serve as a variable resistance dissipating energy. As the temperature of the engine rises further, the resistance of the thermister 99 continues to decrease and further reduces the bias on the transistor switch 75' until it is rendered nonconductive, thereby fully retarding the initial timing of the ignition system 11.

Alternatively, the control circuit 77 shown in FIG. 4 may be used to advance the timing of the ignition system 11 under predetermined engine operating conditions. Under normal engine loads and operating temperatures, the vacuum switch 97 may be closed and the resistance of the thermister 99 may be relatively low so as to remove the forward bias from the transistor switch 75', and the initial timing of the ignition system 11 may be set without the resistor 73 connected across the tank circuit 35. Accordingly, when the engine is cold and under a relatively light load, the vacuum switch 97 is opened and the thermister 99 provides a relatively high resistance so as to forwardly bias the transistor switch 75' into saturation to electrically connect the resistor 73 across the tank circuit 35, thereby advancing the timing of the ignition system 11. As the engine load and temperature increase, the vacuum switch 97 closes and the resistance of the thermister 99 decreases so as to gradually reduce the bias on the transistor switch 75' causing it to operate in the active region and serve as a variable resistance. As the temperature of the engine increases to normal, the forward bias on the transistor switch 75' is further reduced until it is rendered nonconductive.

Although the present invention has been illustrated and described with the resistor 73 connected directly across the tank circuit 35 by the transistor switch 75, it is to be understood that a greater potential difference could be applied across the serially connected resistor 73 and transistor switch 75 by connecting them across the tank circuit 35 and another resistor connected in series with the tank circuit 35. Moreover, it is to be understood that the initial timing of the ignition system 11 could be varied, either gradually or in steps, according to other engine operating conditions, such as the speed of the engine.

What is claimed is:

1. An ignition system, comprising:
    ignition means operable in response to a timing signal for supplying an ignition pulse to an engine,
    an electrically conductive trigger wheel rotatable in synchronization with the operation of the engine and having a plurality of teeth formed on its periphery,
    feedback oscillator having an inductive coil located adjacent said trigger rotor and connected in parallel with a capacitor to form a LC tank circuit determining the operation of the oscillator in producing an oscillatory output signal, said oscillator requiring a minimum energy level in said LC tank circuit to sustain the oscillatory signal, and said LC tank circuit coupling the input and output of said oscillator,
    said trigger wheel being inductively coupled to said oscillator through said coil upon movement of at least one of said teeth into proximity with said coil whereupon a current is established in said wheel by said oscillations, absorbing energy from the oscillator circuit and lowering the energy level of said oscillator below said minimum level for sustained oscillations at a particular distal relationship between said tooth and said coil to stop said oscillatory output signal, demodulator means for receiving the oscillatory output signal from said oscillator and being operable in response to the absence of the oscillatory signal for producing a timing signal to actuate said ignition means, ignition timing control means operable in response to a predetermined engine operating condition for selectively applying an energy dissipating element in circuit with said LC tank circuit between said oscillator input and output to control the energy level of said oscillations so that said oscillatory output is stopped at a different distal relationship between said tooth and said coil dependent upon the magnitude of said element so as to change the timing of the ignition pulses.

2. An ignition system according to claim 1 wherein said ignition timing control means includes:

a resistor and a switch means connecting the resistor across said oscillator tank circuit, said switch means being rendered conductive or nonconductive in response to control signals.

control means sensing selected operating characteristics of the engine and normally producing a control signal effecting one conductive condition of said switch means, and said control means being operable in response to a predetermined engine operating condition for producing a different control signal changing the conductive condition of said switch means.

3. In an ignition control system according to claim 2, said control means sensing a plurality of selected operating characteristics of the engine and producing the different control signal changing the conductive condition of said switch means in response to a predetermined combination of engine operating conditions.

4. In an ignition system according to claim 2, said control means sensing the temperature and load of the engine and being operable in response to a predetermined engine temperature and load condition for producing a control signal effecting a change in the conductive condition of said switch means.

5. In an ignition system according to claim 2:

said switch means being a transistor normally biased into saturation or nonconductive in response to control signals, said control means normally producing a control signal effecting one conductive condition of said transistor and being operable in response to a predetermined engine operating condition for producing a different control signal gradually changing the bias on the transistor to operate it in the active region and provide a varying resistance as it changes to the other conductive condition.

* * * * *